W. A. SMITH.
ELECTRIC PROD POLE.
APPLICATION FILED AUG. 9, 1915.
1,210,112.
Patented Dec. 26, 1916.
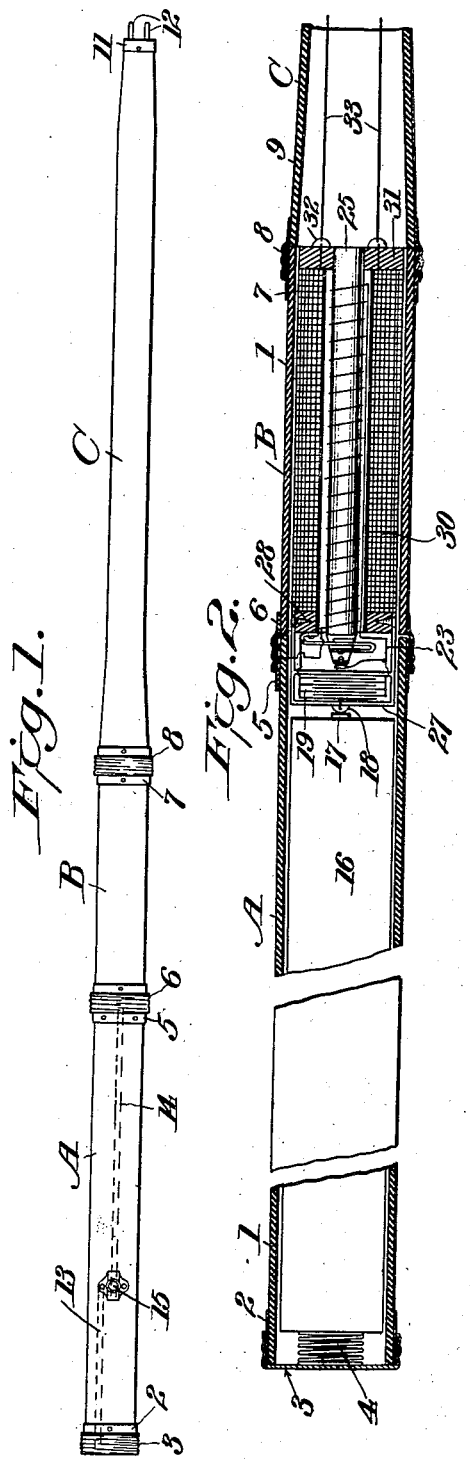

UNITED STATES PATENT OFFICE.

WILLIAM A. SMITH, OF SAN ANGELO, TEXAS.

ELECTRIC PROD-POLE.

1,210,112.  Specification of Letters Patent.  Patented Dec. 26, 1916.

Application filed August 9, 1915. Serial No. 44,535.

*To all whom it may concern:*

Be it known that I, WILLIAM A. SMITH, a citizen of the United States, residing at San Angelo, in the county of Tom Green and State of Texas, have invented certain new and useful Improvements in Electric Prod-Poles, of which the following is a specification.

This invention relates to certain improvements in electric prod poles to be used in the place of the ordinary prod pole for driving or controlling animals on ranches, stockyards, and similar places.

The object of the invention is to provide a simple, compact, and practical apparatus of this character which shall be capable of efficiently generating an electric discharge of sufficient power to produce the desired result.

In order that the invention may be clearly understood, reference is had to the accompanying drawing, forming a part of this specification, and in which, Figure 1 is a side elevation of the complete prod pole; Fig. 2 is an enlarged longitudinal section through the same, parts being broken away; Fig. 3 is a longitudinal section through that end of the pole which comes in contact with the animal; Fig. 4 is an end elevation thereof; and, Fig. 5 is a fragmentary longitudinal section on a still larger scale, showing the operative parts of the induction coil and condenser, such parts being shown more or less conventionally so as to illustrate the electric connections.

Referring to the drawings in detail, my improved prod pole consists of three tubular sections, which I have designated A, B, and C. These sections may be made of sheet metal, or hard fiber, or the like.

The tube 1 of section A has at one end a metal ferrule 2, provided with threads to receive a screw-threaded cap 3. This cap has secured to the inside thereof a short helical spring 4, the free end of which is adapted to rest against the bottom of a battery cell hereinafter described. The other end of the tube 1 of section A has a screw-threaded ring or ferrule 5 secured thereto, adapted to engage a similarly threaded ring 6 which is secured to the tube of section B. This tube of section B has secured to the opposite end a ring or ferrule 7, threaded to enter a similarly threaded ring or ferrule 8, secured to the end of section C. The tube 9 of section C preferably tapers from the end adjacent section B to its free end, for the sake of lightness. The free end of the tube 9 of section C is closed by a disk 10 of insulating material, held in position by a ferrule 11, having a flange as clearly shown in Figs. 3 and 4. The contact points or electrodes, adapted to come in contact with the skin of the animal, consist of short pins 12, having blunt or rounded points, and set into the disk 10, as shown.

The section A constitutes the handle of the pole and is provided with a push button 15, for controlling the electric circuit. From this button extends a thin metallic strip 13 to the ferrule 2, and a similar strip 14 to the ferrule 5, these strips being placed on the inside of the tube 1 and suitably insulated. When the button 15 is pressed, the result is to connect the ferrules 2 and 5.

In the section A is placed a battery cartridge 16, composed of a suitable number of dry cells arranged end to end. The metallic bottom of the left hand end cell forms one terminal, while the end 17 of the carbon electrode of the right hand cell forms the other terminal. By means of the spring 4, the terminal 17 is pressed into engagement with a contact button 18, which is electrically connected with one side 19 of a suitable condenser. This condenser may be of any desired construction and is merely shown conventionally in Figs. 2 and 5.

A wire 20 connects the button 18 and one side of the condenser with a vibrator spring 21. The free end of this spring is adapted to make and break connection with a contact screw 22. The screw 22 is connected by means of a wire 23 with the other side of the condenser and with one end of the primary winding 24 of an induction coil, which is inclosed within the section B. The other end of the winding 24 is connected through a wire 26 with the ferrule 5. The winding 24 incloses a soft iron core 25, the end of which is set into a disk 28 of insulating material, which disk supports the vibrator spring 21. A suitable casing 27, inclosing the condenser, may also be mounted upon the disk 28.

A tube 29 of insulating material preferably surrounds the primary winding 24 of the induction coil, and outside of the tube 29 is wound the secondary winding 30. The terminals of the coil 30 are brought to binding posts 32, carried by a disk 31 of insulating material into which the end of the core 25, opposite the vibrator, is set. From the binding posts 32 extend insulated conductors 33 to the points or electrodes 12.

The operation of the device will be obvious. When the push button 15 is closed, current flows from the left hand end of the battery (assuming this to be the positive) through the spring 4, cap 3, ferrule 2, strip 13, button 15, strip 14, ferrule 5, wire 26, coil 24, wire 23, contact 22, vibrator spring 21, wire 20, contact button 18, to the other terminal 17 of the battery. This energizes the core 25 and causes the spring 21 to vibrate in a well known manner, thus inducing a high tension current in the secondary coil 30. By suitably proportioning the number of turns in the windings 24 and 30, any desired voltage may be thus obtained. This high voltage is led from the secondary coil 30 through the conductors 33 to the prod points 12, with the result that when such points are brought into contact with the skin of an animal, a sharp stinging sensation is produced.

The condenser is employed to bridge the gap between the vibrator 21 and contact 22, for magnifying the current variation and consequently increasing the induced voltage. The condenser may, however, be omitted without departing from the spirit of the invention.

It will be seen that the entire device is made up of standard interchangeable parts which may be readily renewed or repaired, and it is thought that the many advantages of the invention will be appreciated by those familiar with such matters, without further discussion.

What I claim is:

1. An electric prod pole containing a constant potential source of current, means within the pole for raising the voltage of the current, and means for locally discharging such high voltage current through the skin of an animal.

2. An electric prod pole comprising a handle section, a battery in said section, a push button carried by such section for controlling the circuit of said battery, a body section, prod points carried by said body section, and means for raising the voltage of the battery current and supplying such higher voltage to said prod points.

3. A prod pole made up of a plurality of tubular sections, a battery in one section, an induction coil in another section, and prod points carried by a third section, all of said parts being operatively connected.

4. A prod pole made up of a plurality of tubular sections, of insulating material, screw-threaded metal ferrules carried by the ends of the sections and serving to mechanically unite them, and electrical apparatus inclosed within said sections and having its connections completed through said ferrules.

In testimony whereof I have affixed my signature.

WILLIAM A. SMITH.